(12) United States Patent
Xiao et al.

(10) Patent No.: US 10,511,674 B2
(45) Date of Patent: Dec. 17, 2019

(54) GESTURE BASED SWITCHING OF VIRTUAL DESKTOP CLIENTS

(71) Applicant: VMware, Inc., Palo Alto, CA (US)

(72) Inventors: Lei Xiao, Beijing (CN); Yanchao Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 442 days.

(21) Appl. No.: 14/256,825

(22) Filed: Apr. 18, 2014

(65) Prior Publication Data

US 2015/0304433 A1    Oct. 22, 2015

(51) Int. Cl.
  *G06F 15/16* (2006.01)
  *H04L 29/08* (2006.01)

(52) U.S. Cl.
  CPC .................. *H04L 67/148* (2013.01)

(58) Field of Classification Search
  CPC ....... H04L 67/148; G06F 3/017; G06F 9/452; G06F 9/45533
  See application file for complete search history.

(56) References Cited

U.S. PATENT DOCUMENTS

| | | | | |
|---|---|---|---|---|
| 2005/0093868 A1* | 5/2005 | Hinckley | ................ | G06F 3/011 345/502 |
| 2005/0210418 A1* | 9/2005 | Marvit | .................. | G06F 3/0346 715/863 |
| 2009/0309846 A1* | 12/2009 | Trachtenberg | .......... | G06F 3/017 345/173 |
| 2011/0004680 A1* | 1/2011 | Ryman | ................. | G06F 9/4445 709/224 |
| 2011/0131332 A1* | 6/2011 | Bouazizi | ............. | H04L 65/1093 709/227 |
| 2011/0197147 A1* | 8/2011 | Fai | ........................ | G06F 1/1639 715/753 |
| 2011/0202640 A1* | 8/2011 | Pillutla | ................. | G06F 9/4856 709/221 |
| 2011/0213911 A1* | 9/2011 | Eidus | .................... | G06F 9/4856 711/6 |
| 2011/0265003 A1* | 10/2011 | Schubert | ................ | G06F 3/048 715/716 |
| 2011/0277027 A1* | 11/2011 | Hayton | .............. | H04L 63/0815 726/8 |
| 2012/0023554 A1* | 1/2012 | Murgia | ................. | H04L 63/102 726/4 |
| 2012/0249443 A1* | 10/2012 | Anderson | ............... | A63F 13/06 345/173 |
| 2014/0053054 A1* | 2/2014 | Shen | ................... | G06F 16/9577 715/234 |

(Continued)

OTHER PUBLICATIONS

Suzanne Labarre, "It Exists! MIT Creates Tech for Moving Files Across Devices With a Swipe", May 7, 2012, Co.Design, http://www.fastcodesign.com/1669697/it-exists-mit-creates-tech-for-moving-files-across-devices-with-a-swipe.*

*Primary Examiner* — Jonathan A Bui

(74) *Attorney, Agent, or Firm* — Fish & Richardson P.C.

(57) ABSTRACT

A computer implemented method receives a switch session request from a source client device that is running a virtual desktop session. The method identifies a list of one or more potential destination client devices based on the source client device. The method then selects a desired destination client device from the list, disconnects the virtual desktop session from the source client device, and establishes a connection between the virtual desktop session and the desired destination client device.

27 Claims, 6 Drawing Sheets

(56) References Cited

U.S. PATENT DOCUMENTS

| | | | |
|---|---|---|---|
| 2014/0165164 A1* | 6/2014 | Pizurica | H04L 67/36 726/5 |
| 2015/0281322 A1* | 10/2015 | Dingwell | H04L 67/025 705/26.82 |
| 2015/0281333 A1* | 10/2015 | Albert | H04L 67/10 715/744 |
| 2016/0266915 A1* | 9/2016 | Morelli | H04L 67/08 |
| 2016/0373532 A1* | 12/2016 | Ilan | H04L 67/141 |

* cited by examiner

GESTURE BASED SWITCHING OF VIRTUAL DESKTOP CLIENTS

BACKGROUND

A desktop environment traditionally runs on top of an operating system to provide an intuitive graphical user interface for the user to perform various activities such as access files, edit files, or run applications. As a result, the desktop environment is tied to the physical client device that the operating system is installed on. In recent years, virtual desktop environments have allowed the desktop environment to become separated from the physical client device. The virtual desktop environment is hosted on a server and physical client devices can connect to the virtual desktop environment by communicating with the server. Once connected, the virtual desktop environment can be accessed via the connected client device. This allows a user to start a task on a first client device and continue the task on a second client device. A typical example is a user connecting to the virtual desktop environment with a mobile device when the user is outside the office and connecting to the virtual desktop environment with a desktop computer when the user is in the office. However, switching a virtual desktop environment from a first client device to a second client device can be a cumbersome process. Typically, a user must first disconnect the virtual desktop environment from the first client device and then connect the virtual desktop environment on the second client device. User error during the connection or disconnection process can lead to problems connecting to the virtual desktop environment, which can be frustrating to the user.

DETAILED DESCRIPTION

Figure 1:
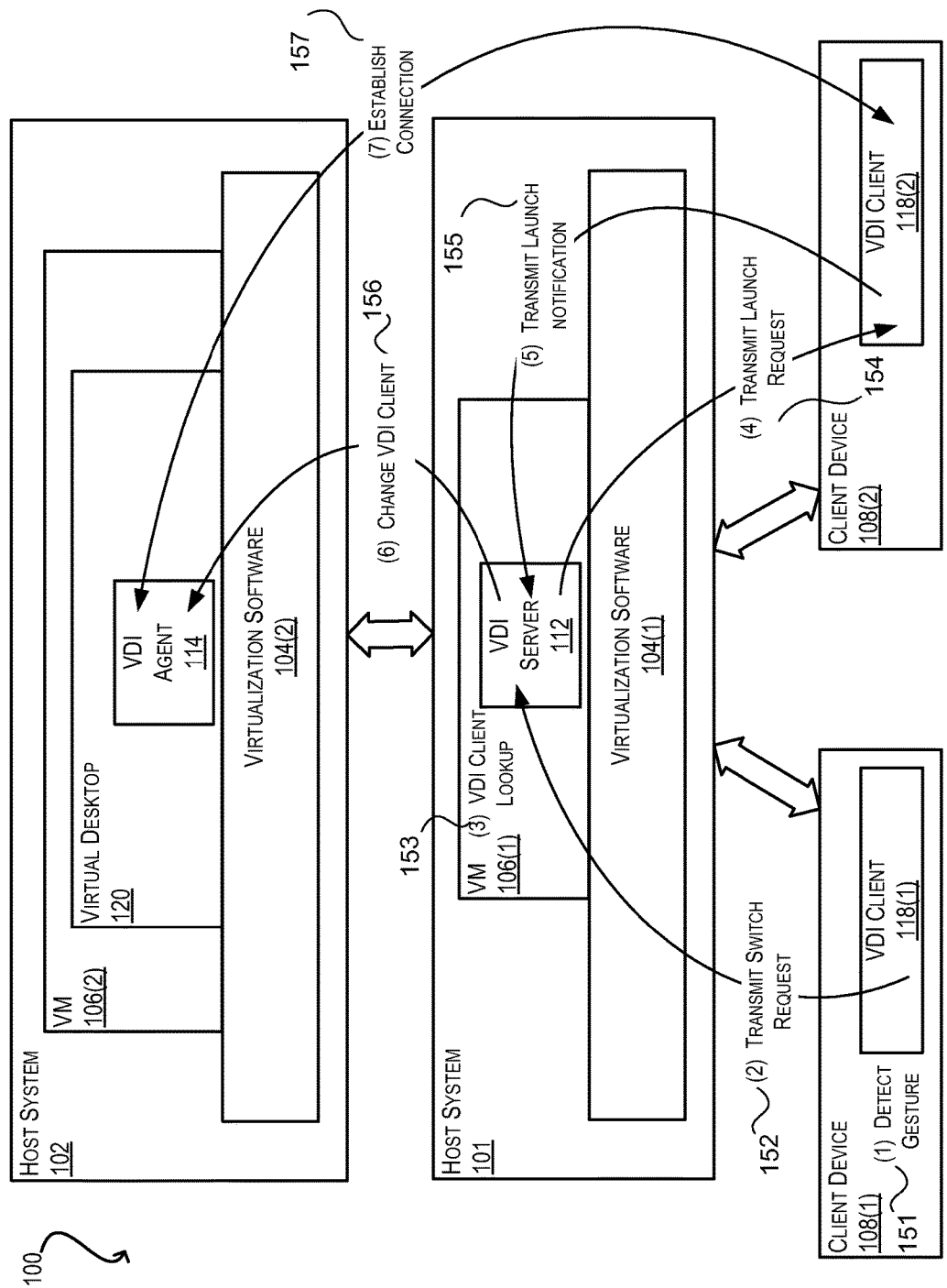
FIG. 1 depicts a workflow for switching a virtual desktop from a VDI client to another VDI client according to one embodiment.

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Techniques are described for using a gesture to switch a virtual desktop environment (i.e., virtual desktop) from a source virtual desktop infrastructure (VDI) client to a destination VDI client. A user performs a gesture that is detected by a source VDI client to indicate a desire to switch the virtual desktop to a different VDI client. The gesture may be any touch, movement, or other input provided by the user. For example, the user may perform a five finger touch on the touch screen of a tablet computer when the VDI client is running on the tablet computer and this gesture may indicate that the user wishes to switch the virtual desktop session to a personal computer (PC) located nearby. Switching the virtual desktop session includes maintaining the state of the session information so that it is not lost and is instead transferred between the source device and the destination device. As a result, any applications that are open would remain open. Once the gesture is detected, the source VDI client can transmit a switch request to a VDI server. The VDI server can process the switch request to identify a destination VDI client that is also associated with the user. Once identified, the VDI server can transmit a launch desktop request to the destination VDI client. The launch desktop request can include the credentials to authenticate the user to connect to the virtual desktop on destination VDI client. The destination VDI client can in turn provide these credentials to the VDI server which uses these credentials to establish a connection between the VDI agent of the virtual desktop and the destination VDI client. In some examples, the source VDI client is running on a source client device while the destination VDI client is running on a destination client device, which may be physically located in proximity to the location of the user at the time when the gesture was detected.

In some scenarios, the VDI server can identify multiple VDI clients that can be the user's desired destination. In one example, the VDI server can transmit the potential destination VDI clients to the source VDI client where the user can make a selection. In another example, the VDI server can transmit a launch desktop request to each potential destination VDI client. The launch desktop request can be processed by each potential VDI client to generate a prompt asking if the user would like to switch to the client device corresponding to the VDI client. A user acceptance can be detected on the desired destination VDI client thus causing the desired destination VDI client to transmit a launch notification to the VDI server. The VDI server can process the launch request and instruct the VDI agent to connect the virtual desktop with the desired destination VDI client. In yet other examples, the VDI server can automatically select the desired destination VDI client based on factors such as the proximity of a destination VDI client to the source VDI client or the time of day that the switch request is transmitted.

FIG. 1 depicts a workflow for switching a virtual desktop from a VDI client to another VDI client according to one embodiment. As shown, virtual infrastructure 100 includes host system 101 that executes virtualization software 104(1) and host system 102 that executes virtualization software 104(2). Virtualization software 104(1) and 104(2) are software layers that provide an environment in which deployed virtual machines (VMs) of host system 101 and 102, respectively, can run. In some examples, virtualization software 104(1) and 104(2) can support multiple VMs simultaneously. In one embodiment, the virtualization software can interact directly with the hardware platform of the corresponding host system without an intervening host operating system. In this embodiment, virtualization software 104 can include a kernel (not shown) that manages VM use of the various hardware devices of host system 101. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

VMs 106(1) and 106(2) running on host system 101 and 102 can execute a guest OS and one or more software applications (e.g., databases, business applications, etc.). Here, VM 106(2) can execute virtual desktop 120. Virtual desktop 120 is a desktop environment that is running on VM 106(2). Client device 108 can access the virtual desktop remotely. In some embodiments, virtual desktop 120 can be a session of the desktop environment running on VM 106(2). There can be multiple sessions of the desktop environment running at the same time.

The desktop environment can be shared and migrated between multiple client devices. VDI agent 114 manages the virtual desktop 120 for client devices 108. Client devices 108 access virtual desktop 120 through VDI server 112, which manages virtual desktop connections between virtual desktop 120 and client device 108(1) or 108(2). Although VDI server 112 is shown as running in VM 106(1) (e.g., as an application server), VDI server 112 may run in a physical computing machine in a non-virtualized environment.

In the initial state, VDI client 118(1) of client device 108(1) is connected to virtual desktop 120 running in VM 106(2). VDI client 118(1) may manage the view of virtual desktop 120 on client device 108(1). That is, VDI client 118(1) sends inputs received at client device 108(1) to VDI agent 114, which then process the inputs using virtual desktop 120. The result of the processing is sent back to VDI client 118(1) and displayed on client device 108(1).

VDI server 112 of VM 106(1) manages the connections between VDI agent 114 and different VDI clients, including VDI client 118(1) of client device 108(1) and VDI client 118(2) of client device 108(2). Together, VDI client 118(1), VDI client 118(2), VDI server 112, and VDI agent 114 manage the migration of virtual desktop 120 from one client device to another client device. The workflow begins at step (1) (reference numeral 151) with a gesture being detected by VDI client 118(1) of client device 108(1). The gesture can be detected on a touch interface of client device 108(1) or can be detected on some other user interface of client device 108(1). In the case of gestures, the gesture can be a predefined gesture that is based on one or more fingers touching the touch interface and moving in a specified direction. For instance, the gesture can be a five finger swipe across a touch interface of client device 108(1). In other embodiments, inputs other than a gesture may be used. For example, an input from a keyboard or mouse may be the gesture.

VDI client 118(1) determines that the user wishes to connect virtual desktop 120 to a VDI client other than VDI client 118(1) upon detecting the gesture. At step (2) (reference number 152), VDI client 118(1) can generate a switch request and transmit the switch request to VDI server 112 of VM 106(1). The switch request is a message configured to notify VDI server 112 that VDI client 118(1) wishes to migrate virtual desktop 120 to a destination client device. This is performed by disconnecting virtual desktop 120 from client device 108(1) and connecting virtual desktop 120 to a destination client device. Hereinafter, the VDI client transmitting the switch request is known as the source VDI client and the VDI client of the destination client device is known as the destination VDI client.

At step (3) (reference number 153), VDI server 112 can perform a VDI client lookup to determine potential destination VDI clients for VDI agent 114 in response to the switch request. The potential VDI clients are potential destinations for virtual desktop 120 running on VM 106(2). The potential VDI clients can be client devices that are owned (or accessible) by the same user that owns or is using client device 108(1). In some embodiments, the potential destination VDI clients may be selected based on the location of the user. For example, the switch request may contain the geographic coordinates or other location information obtained from a global positioning system (GPS) unit embedded in client device 108(1). Based on such location information, the VDI server 112 may select a destination VDI client on the assumption that the user wishes to log into a different device that is nearby (e.g., within a certain proximity of the user). Here, VDI client lookup returns VDI client 118(2) as a VDI client that belongs to another client device that is accessible by the same user. Thus, VDI client 118(2) is the destination VDI client for the switch.

Once VDI client 118(2) has been identified, VDI server 112 can transmit a launch request to VDI client 118(2) (e.g., the destination VDI client) at step (4) (reference numeral 154). The launch request can notify the destination VDI client that VDI server 112 is attempting to process a request to switch a virtual desktop connection to the destination VDI client. In some examples, the launch request can include credentials that are used by VDI client 118(2) to seamlessly log into VDI client 118(2) or client device 108(2). The credentials can include personal user information such as a login/password or a user unique identifier. The credentials can also include an identifier for VDI agent 114 such as a session ID and/or a desktop ID so that VDI client 120 can locate the unique virtual desktop that it will be establishing a connection with.

At step (5) (reference numeral 155), VDI client 1118(2) accepts the launch request and in turn transmits a launch notification to VDI server 112. The launch notification can inform VDI server 112 that VDI client 120 has accepted the launch request and is ready to connect with VDI agent 114. In some examples where VDI server 112 manages multiple sessions across multiple desktops, the launch notification can include details on virtual desktop 120 such as the session ID and desktop ID so that a unique virtual desktop can be identified.

Once VDI server 112 receives the launch notification, VDI server 112 can communicate with VDI agent 114 to change the VDI client for virtual desktop 120 at step (6) (reference numeral 156). Changing the VDI client can include disconnecting virtual desktop 120 from VDI client 118(1) and connecting virtual desktop 120 to VDI client 120. At step (7) (reference numeral 157), VDI agent 114 and VDI client 120 can establish a connection. Once a connection is established, an image of virtual desktop 120 can be presented and accessed on a view of client device 108(2).

Figure 2:
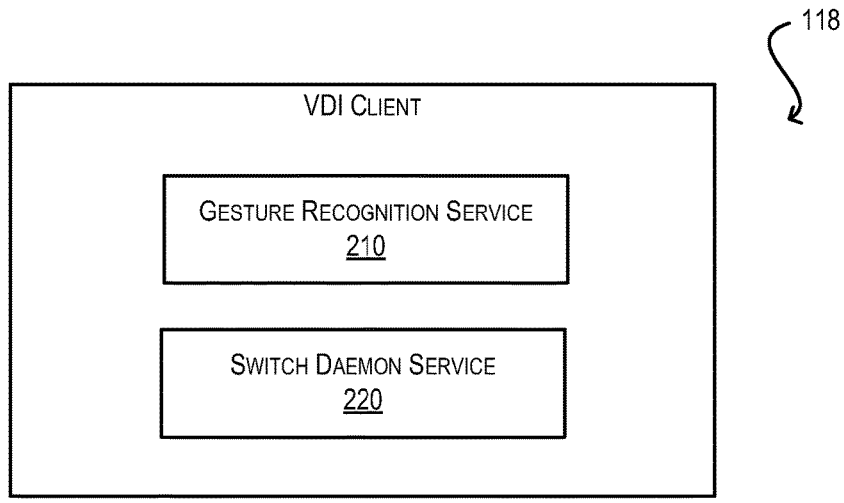
FIG. 2 illustrates a VDI client according to one embodiment.

FIG. 2 illustrates a VDI client 118 according to one embodiment. VDI client 118 includes gesture recognition service 210 and switch daemon service 220. These services are used to support the switching of virtual desktops. Gesture recognition service 210 is a background service running on VDI client 118 configured to detect the predefined gesture that signifies a request to switch VDI clients. When the predefined gesture is detected, gesture recognition service 210 transmits a signal to the switch daemon service 220. Switch daemon service 220 is a background service running on VDI client 118 that listens for requests to switch VDI clients. In the scenario when a request is received to switch VDI clients from gesture recognition service 210, switch daemon service 220 can generate and transmit a switch request to VDI server 112. The switch request can include a unique identifier used to identify VDI client 118 or the client device running VDI client 118. The unique identifier can be used to identify the source of the switch request when processing the switch request. The switch request can also include identifiers for virtual desktop 120 that is connected to VDI client 118.

Figure 3:
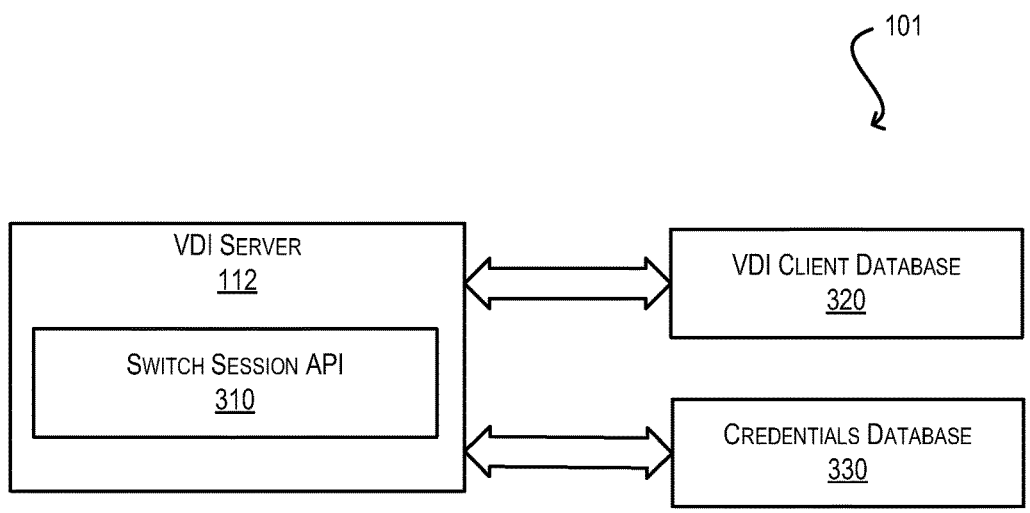
FIG. 3 illustrates a VDI server according to one embodiment.

FIG. 3 illustrates a VDI server according to one embodiment. VDI server 112 includes switch session API 310 that is configured to process switch requests received from source VDI clients. When a switch session request is received from a source VDI client, VDI server 112 can query VDI client database 320 to identify one or more potential destination VDI clients that can resume virtual desktop 120 once it has been suspended by the source VDI client. In one embodiment, VDI server 112 can query VDI client database 320 for potential destination VDI clients based on the unique identifier in the switch request. For example, VDI server 112 can determine the operator of the source VDI client that transmitted the switch request and identify one or more VDI clients in VDI client database 320 that also belong to the operator. These identified VDI clients are potential destination VDI clients for the switch request since the switch request is to suspend virtual desktop 120 on a source VDI client and resume the virtual desktop on a destination VDI client. This allows the operator to continue switch the virtual desktop from the source VDI client to the destination VDI client. In another embodiment, VDI server 112 can query VDI client database 320 for potential destination VDI clients based on an identifier for virtual desktop 120 or VDI agent 114. For example, VDI server 112 can identify VDI clients that can access virtual desktop 120 or VDI agent 114 and remove the source VDI client from the list of identified VDI clients. The remaining VDI clients in the list are potential destination VDI clients.

In some embodiments, credentials may be useful for seamlessly launching the virtual desktop on the destination VDI client. These credentials can include user credentials for logging into a client device or the VDI client running on the client device. Other credentials can include VDI credentials to identify the virtual desktop, such as a session ID and a virtual desktop ID. In one embodiment, switch session API 310 can query credentials database 330 for these credentials based on the destination VDI client or the operator. In one example, switch session API can retrieve user credentials for the operator. The user credentials can allow logging into the destination VDI client or the client device running destination VDI client without requiring the operator to manually enter his login/password information. This can simplify the process for switching the virtual desktop since the operator's login/password does not need to be entered an additional time.

Figure 4:
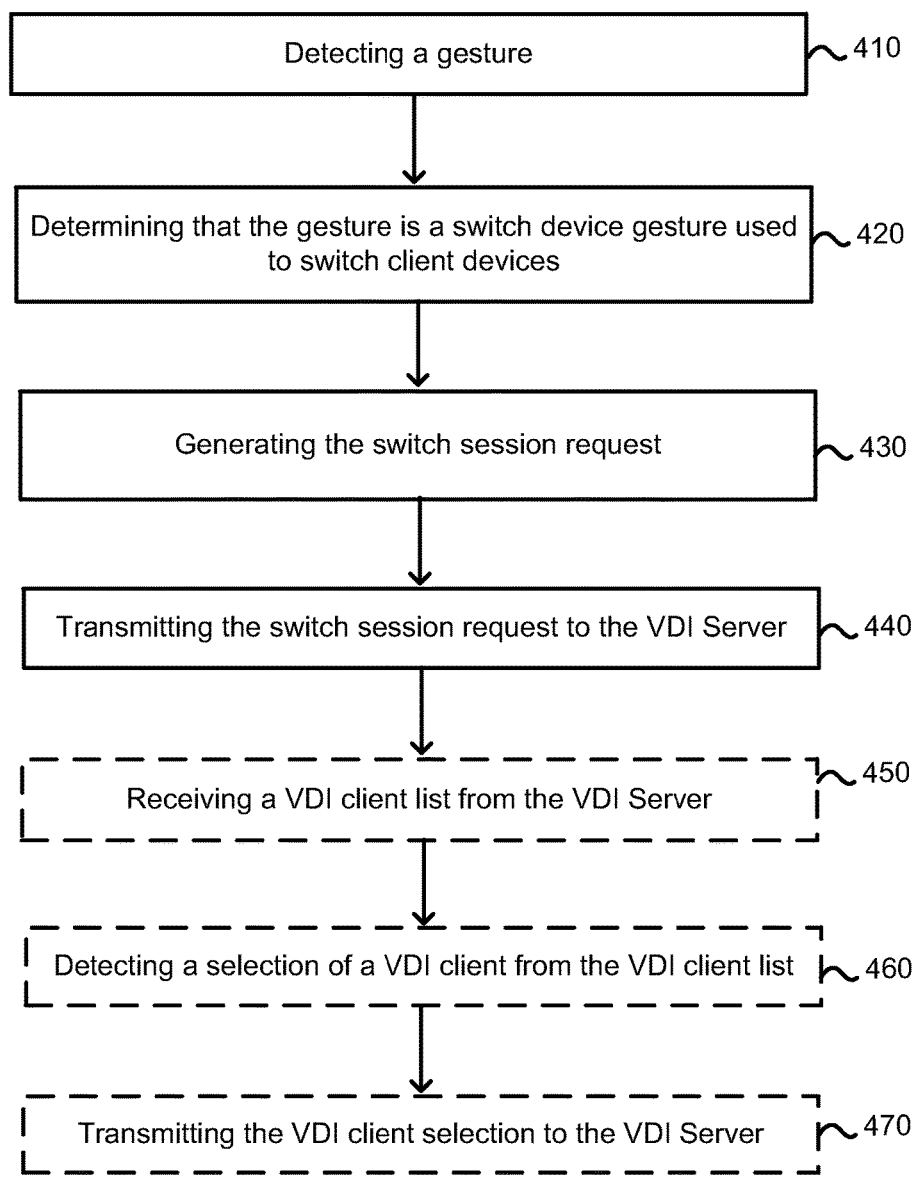
FIG. 4 depicts a simplified flowchart for determining a switch session request at a source VDI client according to one embodiment.

FIG. 4 depicts a simplified flowchart 400 for determining a switch session request at a source VDI client according to one embodiment. At 410, source VDI client 118(1) detects a gesture. The gesture can be detected on a touch screen interface of client device 108(1), a touch pad of client device 108(1), or other user interface belonging to client device 108(1). At 420, source VDI client 118(1) determines that the gesture is a switch device gesture used to signify that the operator of client device 108(1) desires to switch virtual desktop 120 to another client device. In some examples, source VDI client 118(1) can match the predefined switch device gesture with the detected gesture. If the match is within a predetermined threshold, then source VDI client 118(1) determines that the detected gesture is a switch device gesture and begins generating the switch session request at 430. In one embodiment, the switch session request can include a switch signal to notify VDI server 112 of the desire to switch VDI clients and a source VDI client identifier. The source VDI client identifier can be included in the switch session request to allow VDI server 112 to identify the owner of the client device running source VDI client 118(1) so that the owner's other client devices (i.e., potential destination VDI clients) can be identified. At 440, source VDI client 118(1) can transmit the generated switch session request to VDI server 112.

In some situations, multiple potential destination VDI clients can be available for a given source VDI client. The operator may select the desired destination VDI client from the potential destination VDI clients using one of three methods. In the first method, VDI server 112 can transmit a list of potential destination VDI clients to source VDI client 118(1) for the operator to choose from. The operator can select the desired destination VDI client from the list and VDI server 112 can process the switch session request using the desired destination VDI client. In one specific example, the potential destination VDI clients can be in a sorted list. For instance, VDI server 112 can sort the potential destination VDI clients based on the proximity of the source VDI client to the potential destination VDI clients. Potential destination VDI clients that are closer to the source VDI client can be ranked higher in the list and thus positioned higher in the list. In the second method, VDI server 112 can transmit to each potential destination VDI client a launch request. The launch requests can present a prompt on each potential destination VDI client. Instead of using source VDI client 118(1) to select the desired potential destination VDI client as described in the first method, the operator can accept the launch request via the prompt presented on the desired destination VDI client. Upon accepting the launch request, the desired destination VDI client can transmit a launch notification back to VDI server 112 to notify VDI server 112 that a desired destination VDI client has been selected by the operator. VDI server 112 can subsequently establish the connection between the desired destination VDI client and VM 106(2) that is hosting virtual desktop 120. In a third method, VDI server 112 can automatically select a desired destination VDI client from the potential destination VDI clients based on the proximity of the potential VDI clients to the source VDI client. For example, an operator of the client device running the source VDI client can perform a gesture to switch devices. The source VDI client can generate a switch request and transmit it to VDI server 112. VDI server 112 can determine which destination VDI client is the closest to the source VDI client and set that as the desired destination VDI client. This allows an operator to perform the switch gesture on his tablet or other portable electronic device when he is in close proximity to another electronic device such as a desktop computer to migrate the virtual desktop from his tablet to his desktop computer. The source VDI client and the potential destination VDI clients can have obtain the location information from a global positioning system (GPS) unit embedded in their respective client devices. The first method is shown as the optional steps in FIG. 4 and FIG. 5 in its entirety. The second method is shown as optional steps in FIG. 6 and FIG. 7 in its entirety.

As shown in FIG. 4, source VDI client 118(1) can optionally receive a VDI client list from VDI server 112 at

450. The VDI client list, which is a list of potential destination VDI clients for the source VDI client, can be presented on client device 108(1) of source VDI client 118(1). For example, the list can be presented on a display of client device 108(1). At 460, source VDI client 118(1) can detect a selection of a VDI client from the VDI client list. At 470, source VDI client 118(1) can transmit the VDI client selection to VDI server 112 where the switch session request can continue to be processed based on the VDI client selection.

Figure 5:
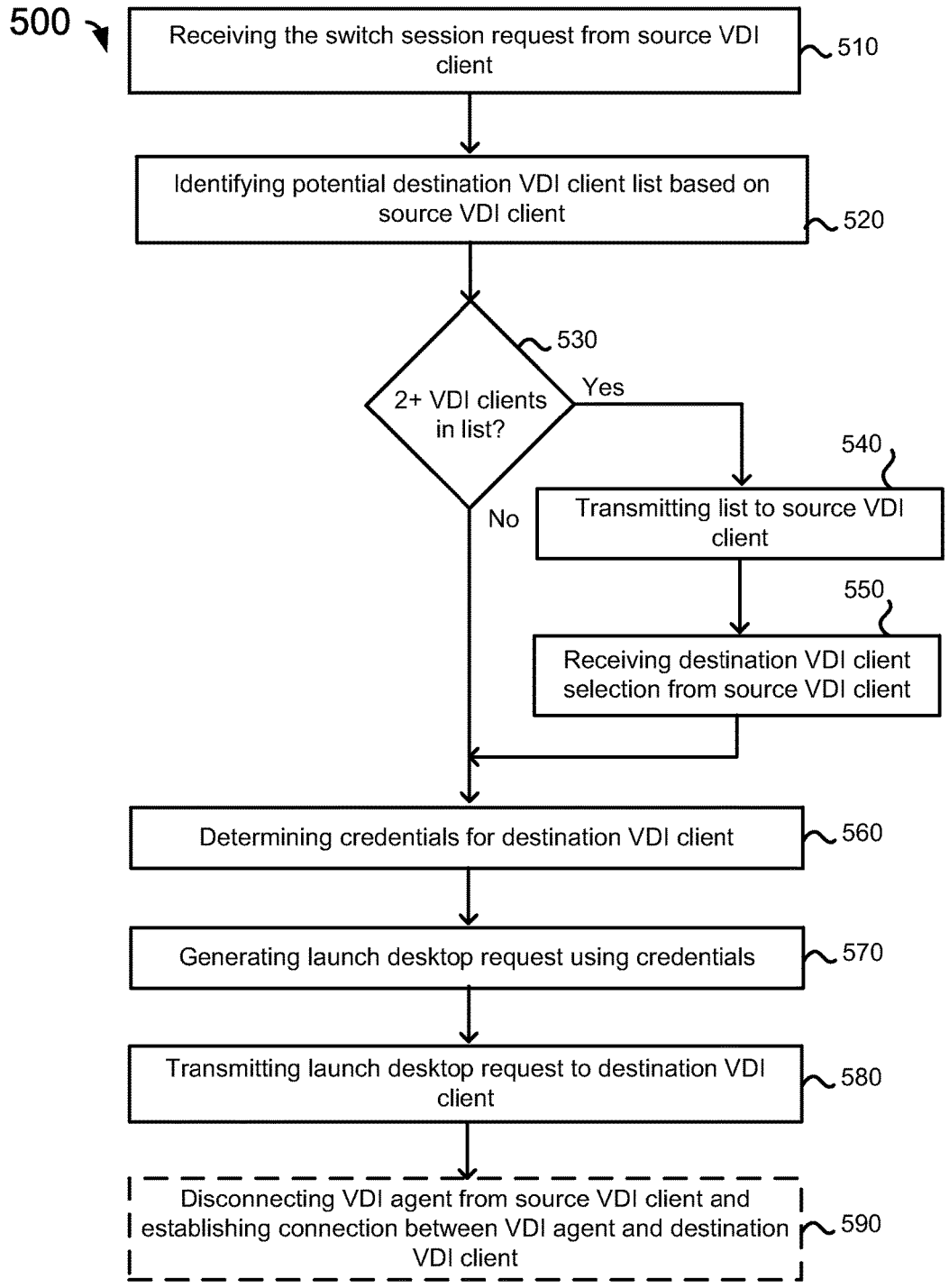
FIG. 5 depicts a simplified flowchart for processing the switch session request at a VDI server where there are multiple potential destination VDI clients according to one embodiment.

FIG. 5 depicts a simplified flowchart 500 for processing the switch session request at a VDI server where there are multiple potential destination VDI clients according to one embodiment. Simplified flowchart 500 is an example where VDI server 112 transmits multiple potential destination VDI clients the source VDI client 118(1) for the operator to select the desired destination VDI client for virtual desktop 120. At 510, VDI server 112 receives a switch session request from a source VDI client. The switch session request can be an XML file that includes a unique identifier of the source VDI client. After receiving the switch session request, VDI server 112 can identify a list of potential destination VDI clients based on the source VDI client at 520. In one embodiment, VDI server 112 can query a VDI client database for VDI clients that are owned or accessible by the operator of source VDI client 118(1). The VDI client database can store a mapping between VDI clients and their respective operators.

After determining the potential destination VDI client list, VDI server 112 can continue by determining if there are two or more destination VDI clients in the list at 530. If there are more than two potential destination VDI clients, then VDI server 112 transmits the potential destination VDI client list to source VDI client 118(1) at 540 so that the operator can manually select the desired destination VDI client from the list. At 550, VDI server 112 receives the operator's selection of the destination VDI client from source VDI client 118(1). At this point, the desired destination VDI client has been determined. If there is only one potential destination VDI client in the list, then the desired destination VDI client is automatically set to the destination VDI client in the list.

Once the desired destination VDI client has been determined, VDI server 112 can determine credentials for the destination VDI client at 560. The credentials can include user credentials for logging into the destination VDI client or the client device running the destination VDI client that have been retrieved from a VDI client database. The credentials can also include virtual desktop metadata such as the session ID or desktop ID that uniquely identifies the virtual desktop that is being switched between devices. At 570, VDI server 112 can generate a launch desktop request using the credentials and/or the virtual desktop metadata. Once the launch request has been generated, VDI server 112 can transmit the launch desktop request to the destination VDI client at 580. Flowchart 500 can conclude with VDI server 112 optionally disconnecting the VDI agent from the source VDI client and establishing a connection between the VDI agent and the destination VDI client at 590.

Figure 6:
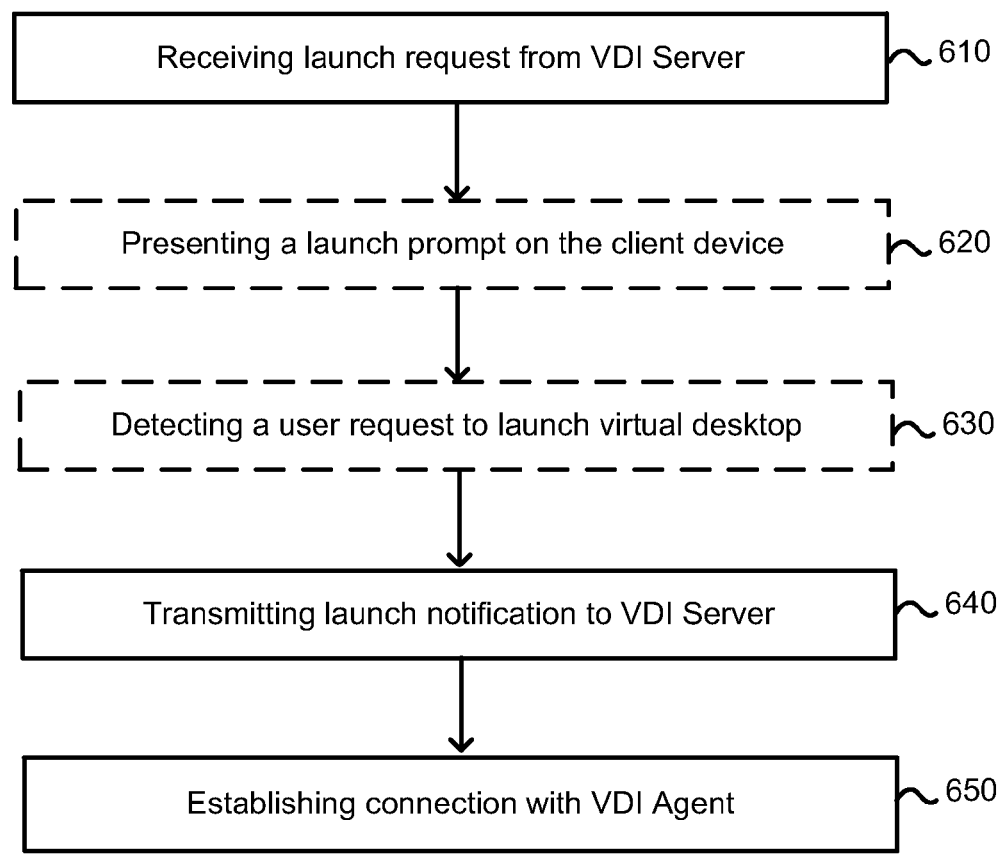
FIG. 6 depicts a simplified flowchart for launching a desktop connection at a destination VDI client according to one embodiment.

FIG. 6 depicts a simplified flowchart 600 for launching a desktop connection at a destination VDI client according to one embodiment. At 610, destination VDI client 118(2) receives a launch desktop request from VDI server 112. After receiving the launch request, destination VDI client 118(2) can transmit a launch notification to VDI server 112 at 640. The launch notification can notify VDI server 112 that the launch request has been accepted. In one example, the launch notification can instruct VDI server 112 to disconnect VDI agent 114 and the source VDI client. In another example, the launch notification can instruct VDI server 112 to connect VDI agent 114 to the destination VDI client 118(2). Once the launch notification has been transmitted, VDI client 118(2) can establish a connection with VDI agent 114 at 650. Establishing the connection can be performed though a series of handshakes that include user credentials and/or virtual desktop metadata, both of which can be received as part of the launch request.

In some embodiments, VDI server 112 can transmit launch requests to multiple destination VDI clients in flows where the operator selects a desired destination VDI client by interacting with the desired destination VDI client. Thus, destination VDI client 118(2) can optionally present a visual launch prompt asking whether there is a desire to connect virtual desktop 120 to destination VDI client 118(2) at 620. This occurs after the launch request is received from VDI server 112 but before the launch notification is transmitted to VDI server 112. After presenting the launch prompt, destination VDI client 118(2) can detect a user request to launch virtual desktop 120 at 630. Upon detecting the user request, destination VDI client 118(2) has been selected as the desired destination VDI client of the operator and the launch notification can be transmitted to VDI server 112 to notify VDI server 112 of the selection. The desired destination VDI client can then establish the connection with the VDI agent at 650.

Figure 7:
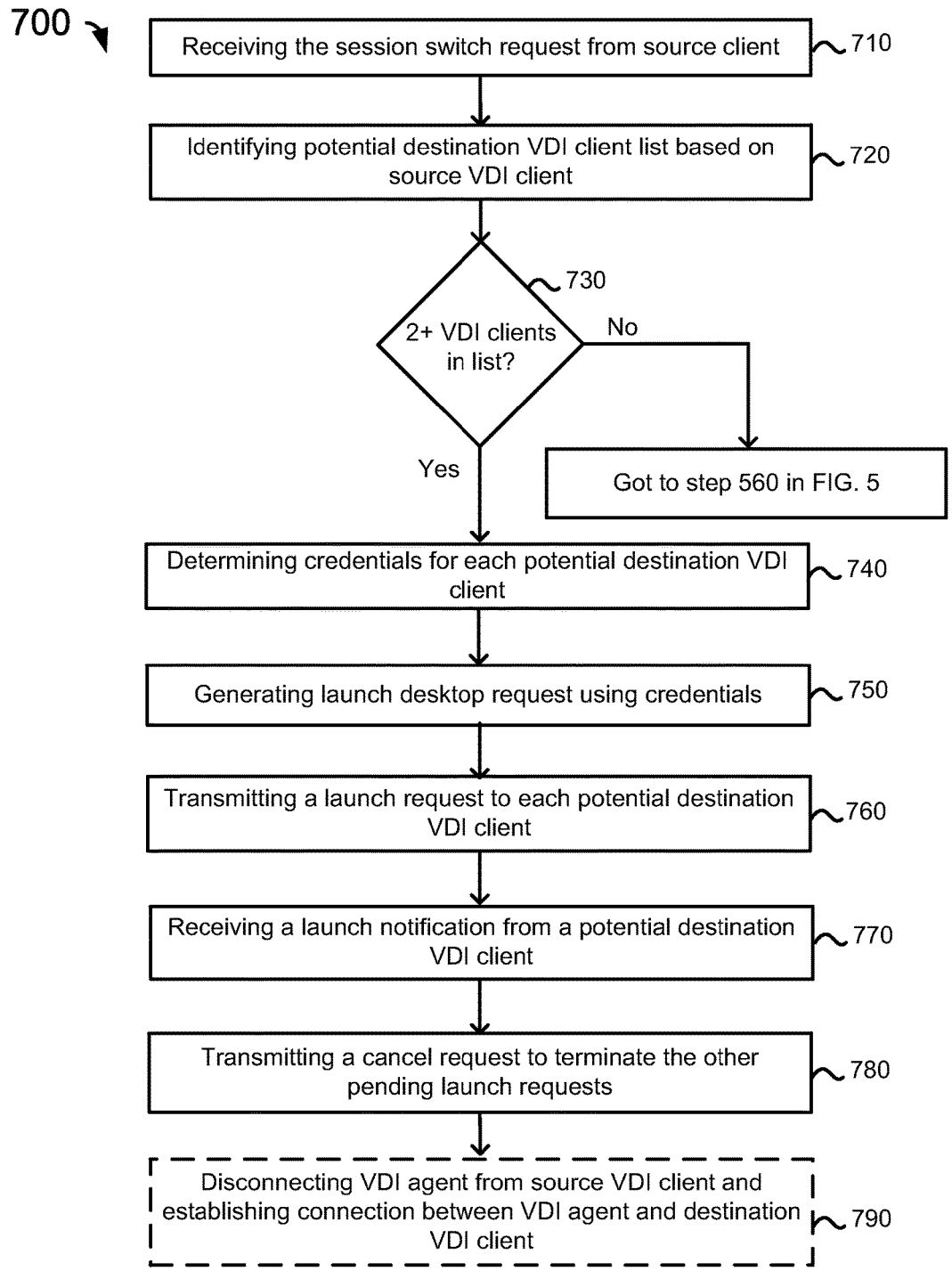
FIG. 7 depicts a simplified flowchart using multiple launch requests at a VDI server according to another embodiment.

FIG. 7 depicts a simplified flowchart 700 using multiple launch requests at a VDI server according to another embodiment. Simplified flowchart 700 is an example where VDI server 112 transmits launch requests to multiple potential destination VDI clients thus allowing the operator to select the destination for virtual desktop 120 by interacting with the desired destination VDI client. At 710, VDI server 112 receives a switch session request from a source VDI client. The switch session request can be an XML file that includes a unique identifier of the source VDI client. After receiving the switch session request, VDI server 112 can identify a list of potential destination VDI clients based on the source VDI client at 720. In one embodiment, VDI server 112 can query a VDI client database for VDI clients that are owned or accessible by the operator of source VDI client 118(1). The VDI client database can store a mapping between VDI clients and their respective operators.

After determining the potential destination VDI client list, VDI server 112 can continue by determining if there are two or more destination VDI clients in the list at 730. If there is only one potential destination VDI client in the list, then the desired destination VDI client is automatically set to the destination VDI client in the list and flowchart 700 resumes at step 560 in FIG. 5. Alternatively if there are more than two potential destination VDI clients, then VDI server 112 retrieves credentials for each potential destination VDI client at 740. As described above, the credentials can include user credentials for logging into the destination VDI client or the client device running the destination VDI client. The credentials can also include virtual desktop metadata such as the session ID or desktop ID that uniquely identifies virtual desktop 120 that is being switched between devices.

At 750, VDI server 112 generates a launch request that includes the credentials. At 750, VDI server 112 transmits a launch request to each potential destination VDI client. Each launch request can include credentials that correspond to the potential destination VDI client. For example a potential destination VDI client can receive a launch request that includes credentials to log into the potential destination VDI client, credentials to log into the client device of the potential destination VDI client, credentials to identify the virtual desktop that is attempting to be presented on the potential VDI client, and/or other types of credentials that are used to establish a connection between destination VDI client and the VDI agent 114. At 770, VDI server 112 receives a launch notification from a potential destination VDI client. VDI server 112 can identify the potential destination VDI client that transmitted the launch notification as the desired destination VDI client. Once the desired destination VDI client has been identified, VDI server 112 can transmit a cancel request to terminate the other pending launch requests at 780. This can remove the launch prompt from the potential destination VDI clients that are not the desired destination VDI client. Once the launch notification is received, VDI server 112 can optionally disconnect the VDI agent from the source VDI client and establish a connection between VDI agent and the destination VDI client.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for migrating a presentation of a virtual desktop session having a state from a source client device to a desired destination client device, comprising:

receiving, by a computing device of a virtual desktop infrastructure host system that is separate from the source client device and the destination client device, a switch session request from a user of the source client device to switch a presented virtual desktop of the user running on a remotely hosted virtual machine from presentation on the source client device to presentation on another client device, the switch session request triggered in response to a user touch gesture detected on the source client device by a user of the source client device;

in response to the switch session request, identifying, by the computing device, a list of one or more potential destination client devices associated with the user based on an identity of the user of the source client device;

selecting, by the computing device, a particular destination client device from the list of potential destination client devices;

initiating, by the computing device, a launch request for the virtual desktop being switched to the particular destination client device, the launch request including user credentials and an identifier of the session of the virtual desktop running on the remotely hosted virtual machine, to be presented on the destination client device;

disconnecting, by the computing device, the virtual desktop session from the source client device; and establishing, by the computing device, a connection between the virtual desktop session and the particular destination client device when the launch request is accepted and the credentials are received from the particular destination client device, wherein the virtual desktop session provided for presentation on the particular destination client device has the state of the virtual desktop session of the source client device.

2. The computer-implemented method of claim 1, wherein identifying the list of potential destination client devices comprises:

identifying, by the computing device, a user identifier associated with the source client device;

querying, by the computing device, a client device database for one or more destination client devices that are associated with the user identifier; and generating, by the computing device, the list from the one or more destination client devices.

3. The computer-implemented method of claim 1, wherein selecting the particular destination client device comprises:

transmitting, by the computing device, the list of potential destination client devices to the source client device; and receiving, by the computing device, a selection of the particular destination client device from the source client device, the particular destination client device being selected from the list of potential destination client devices.

4. The computer-implemented method of claim 1, wherein establishing a connection comprises:

transmitting, by the computing device, the credentials to the particular destination client device; and receiving, by the computing device, the credentials from the particular destination client device, wherein the credentials are used to establish the connection between the particular destination client device and the virtual desktop session.

5. The computer-implemented method of claim 4, wherein the credentials include one or more of a user login/password, a session ID, and a desktop ID.

6. The computer-implemented method of claim 1, wherein the list of one or more potential destination client devices is identified based on the location of the source client at the time of the gesture.

7. The computer-implemented method of claim 1, further comprising:

transferring the state from the source client device to the particular destination client device such that an application open on the source client device remains open on the particular destination client device.

8. The computer-implemented method of claim 1, wherein selecting the particular destination client device comprises:

transmitting, by the computing device, a launch request to each of the potential destination client devices in the list;

receiving, by the computing device, a launch notification from a potential destination client device in the list;

setting, by the computing device, the potential destination client device as the destination client device; and transmitting, by the computing device, a cancel request to each potential destination client device in the list other than the destination client device, the cancel request being configured to cancel the launch request previously transmitted.

9. The computer-implemented method of claim 8, wherein the launch request to each potential destination client device includes the credentials used to establish a connection between the potential destination client device and the virtual desktop session.

10. A non-transitory computer readable storage medium containing instructions, that when executed, control a computer system to be configured for:

receiving a switch session request from a user of a source client device to switch a presented virtual desktop of the user running on a remotely hosted virtual machine from presentation on the source client device to presentation on a destination client device, wherein the switch session request is received at a computing device of a virtual desktop infrastructure host system that is separate from the source client device and the destination client device;

in response to the switch session request, identifying a list of one or more potential destination client devices associated with the user based on an identity of the user of the source client device;

selecting the destination client device from the list of potential destination client devices;

initiating a launch request for the virtual desktop being switched to the destination client device, the launch request including user credentials and an identifier of the session of the virtual desktop running on the remotely hosted virtual machine, to be presented on the destination client device;

disconnecting the virtual desktop session from the source client device; and establishing a connection between the virtual desktop session and the destination client device when the launch request is accepted and the credentials are received from the destination client device, wherein the virtual desktop session provided for presentation on the destination client device has a state of the virtual desktop session of the source client device.

11. The non-transitory computer readable storage medium of claim 10, wherein identifying the list of potential destination client devices comprises:

identifying a user identifier associated with the source client device;

querying a client device database for one or more destination client devices that are associated with the user identifier; and generating the list from the one or more destination client devices.

12. The non-transitory computer readable storage medium of claim 10, wherein selecting the particular destination client device comprises:

transmitting the list of potential destination client devices to the source client device; and receiving a selection of the destination client device from the source client device, the destination client device being selected from the list of potential destination client devices.

13. The non-transitory computer readable storage medium of claim 10, wherein establishing a connection comprises:

transmitting the credentials to the destination client device; and receiving the credentials from the destination client device, wherein the credentials are used to establish the connection between the destination client device and the virtual desktop session.

14. The non-transitory computer readable storage medium of claim 13, wherein the credentials include one or more of a user login/password, a session ID, and a desktop ID.

15. The non-transitory computer readable storage medium of claim 10, wherein selecting the particular destination client device comprises:
transmitting a launch request to each of the potential destination client devices in the list;
receiving a launch notification from a particular potential destination client device in the list;
setting the particular potential destination client device as the destination client device; and
transmitting a cancel request to each potential destination client device in the list other than the destination client device, the cancel request being configured to cancel the launch request previously transmitted.

16. The non-transitory computer readable storage medium of claim 15, wherein the launch request to each potential destination client device includes the credential used to establish a connection between the potential destination client device and the virtual desktop session.

17. An apparatus, comprising:
one or more computer processors; and
a non-transitory computer-readable storage medium comprising instructions, that when executed, control the one or more computer processors to be configured for:
receiving a switch session request from a user of a source client device to switch a presented virtual desktop of the user running on a remotely hosted virtual machine from presentation on the source client device to presentation on a destination client device, wherein the switch session request is received at the apparatus of a virtual desktop infrastructure host system that is separate from the source client device and the destination client device;
in response to the switch session request, identifying a list of one or more potential destination client devices associated with the user based on an identity of the user of the source client device;
selecting one or more destinations client device from the list of potential destination client devices;
initiating a launch request for the virtual desktop being switched to the destination client device, the launch request including user credentials and an identifier of the session of the virtual desktop running on the remotely hosted virtual machine, to be presented on the destination client device;
disconnecting the virtual desktop session from the source client device; and
establishing a connection between the virtual desktop session and the destination client device when the launch request is accepted and the credentials are received from the destination client device, wherein the virtual desktop session provided for presentation on the destination client device has a state of the virtual desktop session of the source client device.

18. The apparatus of claim 17, wherein identifying the list of potential destination client devices comprises:
identifying a user identifier associated with the source client device;
querying a client device database for one or more destination client devices that are associated with the user identifier; and
generating the list from the one or more destination client devices.

19. The apparatus of claim 17, wherein selecting the particular destination client device comprises:
transmitting the list of potential destination client devices to the source client device; and
receiving a selection of the destination client device from the source client device, the destination client device being selected from the list of potential destination client devices.

20. The apparatus of claim 17, wherein establishing a connection comprises:
transmitting the credentials to the destination client device; and
receiving the credentials from the destination client device, wherein the credential is used to establish the connection between the destination client device and the virtual desktop session.

21. The apparatus of claim 17, wherein selecting the particular destination client device comprises:
transmitting a launch request to each of the potential destination client devices in the list;
receiving a launch notification from the particular potential destination client device in the list;
setting the particular potential destination client device as the destination client device; and
transmitting a cancel request to each potential destination client device in the list other than the destination client device, the cancel request being configured to cancel the launch request previously transmitted.

22. The apparatus of claim 21, wherein the launch request to each potential destination client device includes the credentials used to establish a connection between the potential destination client device and the virtual desktop session.

23. The method of claim 1, wherein identifying the list of one or more potential destination client devices associated with the user includes determining client devices having a location in proximity to the source client device.

24. The method of claim 1, wherein identifying the list of one or more potential destination client devices associated with the user includes determining client devices that belong to the user of the source client device.

25. The method of claim 1, wherein identifying the list of one or more potential destination client devices associated with the user includes determining client devices that are configured to access the virtual desktop.

26. The method of claim 1, wherein initiating the launch request for the virtual desktop session comprises:
transmitting a respective launch request to each of a one or more potential destination client devices; and
upon receipt of a user acceptance from the particular destination client device, revoking the respective launch requests sent to the remainder of the potential destination client devices.

27. The method of claim 1, wherein the presentation of the virtual desktop session changes from the source client device to the destination client device without changing a host executing the remotely hosted virtual machine.

* * * * *